United States Patent [19]

Breitenbach et al.

[11] Patent Number: 5,327,637

[45] Date of Patent: Jul. 12, 1994

[54] PROCESS FOR REPAIRING THE WINDING OF AN ELECTRICAL LINEAR DRIVE

[75] Inventors: Otto Breitenbach, Nürnberg; Hermann Möllmann, Osnabrück, both of Fed. Rep. of Germany

[73] Assignee: kabelmetal electro GmbH, Fed. Rep. of Germany

[21] Appl. No.: 10,641

[22] Filed: Jan. 28, 1993

[30] Foreign Application Priority Data

Feb. 7, 1992 [DE] Fed. Rep. of Germany ....... 4203533

[51] Int. Cl.⁵ ............................................. H02K 15/00
[52] U.S. Cl. ................................... 29/596; 29/402.12; 310/12
[58] Field of Search ...................... 29/596, 598, 402.11, 29/402.12, 402.13; 310/12, 13, 27, 42

[56] References Cited

U.S. PATENT DOCUMENTS 5,097,591  3/1992  Weislo et al. ..................... 29/596 X

FOREIGN PATENT DOCUMENTS 3309051  10/1986  Fed. Rep. of Germany .

Primary Examiner—Carl E. Hall
Attorney, Agent, or Firm—Ware, Fressola, Van Der Sluys & Adolphson

[57] ABSTRACT

A process for repairing the winding of an electrical linear drive having three winding strands formed of electrical cables which meander in the grooves of an inductor belonging to an elongated stator. To correct a defect in one of the winding strands, the respective cable is first removed from the grooves of the inductor in the defective area. Then, a section of predetermined length of the cable containing the defect is cut from the winding strand. The removed section of the cable is then replaced by a length of prefabricated cable of suitable length and shape, and the repaired cable is then reattached to the grooves of the inductor.

5 Claims, 3 Drawing Sheets

PROCESS FOR REPAIRING THE WINDING OF AN ELECTRICAL LINEAR DRIVE

BACKGROUND OF THE INVENTION

1. Field of the Invention

The invention refers to a process for repairing the winding of an electrical linear drive having three winding strands formed of electrical cables, which meander in the grooves of an inductor belonging to an elongated stator.

2. Description of the Prior Art

By contrast to conventional drives, both the stator and the rotor of the linear drive are not circular, but linear. The electric energy is converted into mechanical energy in such a way, that it is immediately available for a translation movement. The areas of application for linear drives, for example, are: passenger traffic, conveyance and transportation equipment, conveyor lines, luggage transport, mining, cranes, towing gear, tool machine sleds and slide activation. In principle, the exciter winding of a linear drive can be located in the grooves of an inductor, and have three phases with alternating current. The rotor has a rail made of a good electrical conductor such as copper or aluminum (asynchronous motor), or a permanent magnetic material (synchronous motor). The invention refers to this type of linear drive with a three-phase winding in the stator. A corresponding winding can be found in German Patent Document No. DE-PS 33 09 051, for example.

Depending on where the linear drive is used, the length of its stator differs. Today, the longest length of a stator is probably when such a linear drive is used for a rapid transit magnetic cushion train. In order for the three winding strands not to have to be individually inserted and attached to the grooves of an inductor at the installation site, the windings are prefabricated, wound on coils, transported with the coils to the installation site and installed as a unit into the inductor grooves. This preparation makes the installation considerably easier. There are no problems as long as such a winding contains no defects and functions appropriately. Difficulties occur when a winding strand is damaged, for example, by a short to ground or by a mechanical effect. The defective area must then be quickly corrected, so that the linear drive's ability to function is only interrupted for a short period of time.

SUMMARY OF THE INVENTION

An object of the invention is to provide a process for making a simple and quick repair of the winding.

This object is fulfilled by the invention, in that:

to eliminate a defect in one of the winding strands, first the defective area of the respective cable is removed from the grooves of the inductor, then a section of the cable, of a specific length containing the defect, is removed from the winding strand, the removed section of the cable is then replaced by a prefabricated section of cable of suitable length and shape, the repaired cable is then reattached to the grooves of the inductor.

This process permits removal of the damaged cable or the corresponding part of the winding strand from the grooves of the inductor, so that it becomes accessible for repair. A sizeable length of the winding strand, or of all winding strands, is removed from the grooves, to make enough room for the subsequent operations. A section containing the defect is then cut from the damaged cable. The length of the cut section is predetermined by the size of the prefabricated section that will replace the cut section. The cut section is then disconnected from the three-stranded winding and the prefabricated section is inserted. The prefabricated section is then electrically connected at both separation points of the cable whereby the cable insulation of the connection is restored. The repaired winding strand, possibly with other winding strands, is then returned to the grooves of the inductor.

The repair of the winding is especially simple, when a finished cable length is used as the prefabricated section, the ends of which are equipped with plug-in bushings. The ends of the cable remaining in the stator at the two separation points must then be prepared, so that they can be plugged into bushings.

DETAILED DESCRIPTION OF THE INVENTION

Figure 1:
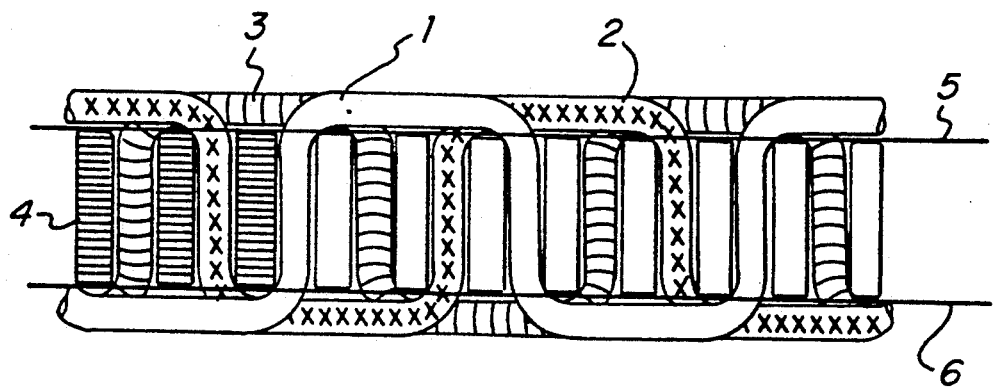
FIG. 1 is a top view of a section of a three-phase winding that can be repaired in accordance with the process of the invention.

In FIG. 1, three electrical cables are designated 1, 2 and 3, and represent the winding strands of a three-phase alternating current winding, which have been joined into a cohesive winding as the stator of a linear drive. The inductor 4 of the stator, composed of laminated sheet metal, is also schematically indicated in FIG. 1. Holding bands 5 and 6 may be attached to the area of the winding heads protruding from inductor 4, which run along the full length of the stator and are composed of an easily bendable material that resists extension. The use of stainless steel holding bands is preferred.

Cables 1, 2 and 3 may be semi-stiff, nonresilient, medium or low voltage cables, with a conductor made of copper or aluminum wire, over which a conductive finish can be placed. This is covered by insulation made of a heat resistant material, over which a shield made of conductive insulation material, particularly of plastic, can be placed.

Figure 2:
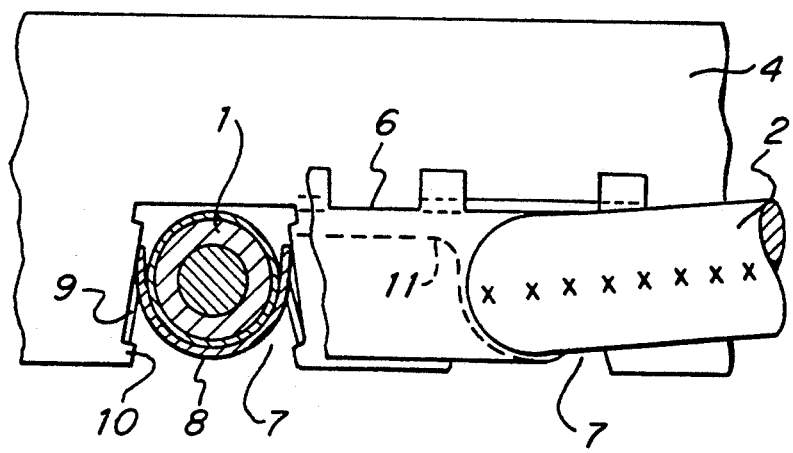
FIG. 2 is a side elevational view of a single winding in enlarged form with portions broken away to show internal structure.

As seen in FIG. 2, holders 8 (only one shown) are installed for the areas of cables 1, 2 and 3 that are parallel to each other and are intended for the grooves 7 in inductor 4. The holders 8 form a channel for the cables 1, 2 and 3 and secure the cables 1, 2 and 3 in the grooves 7. Each holder 8 may be a half shell of rigid plastic material which extends over the full length of its associated groove 7. The half shell may have resilient, laterally protruding arms 9, whose location in the installed winding condition is shown in FIG. 2. The resilient, laterally protruding arms 9 serve to fasten the holder 8 in its associated groove 7 of inductor 4. The arms 9, in their final position, are located behind corresponding protrusions 10 in the groove 7, thus securing the holder 8, and the cable located in the half shell, in the groove 7.

When electrical cables 1, 2 and 3 with an outer conductive jacket are used as winding strands, a grounding band 11 must be placed along the stator, as indicated in FIG. 2. It is practical to install band 11 while the winding is being manufactured, which then is essentially parallel to the holding bands 5 and 6, at least on one side of the winding.

Figure 3:
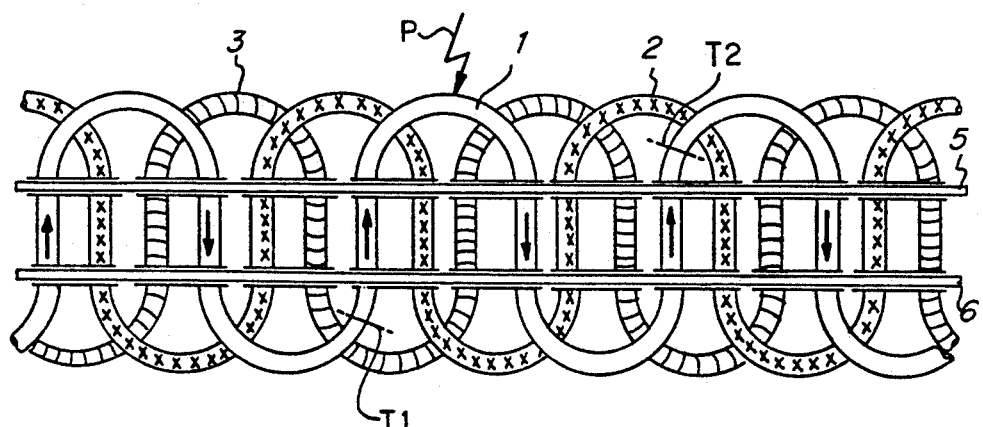
FIG. 3 is a view of a section of the winding with one of the winding strands having a defect.
Figure 4:
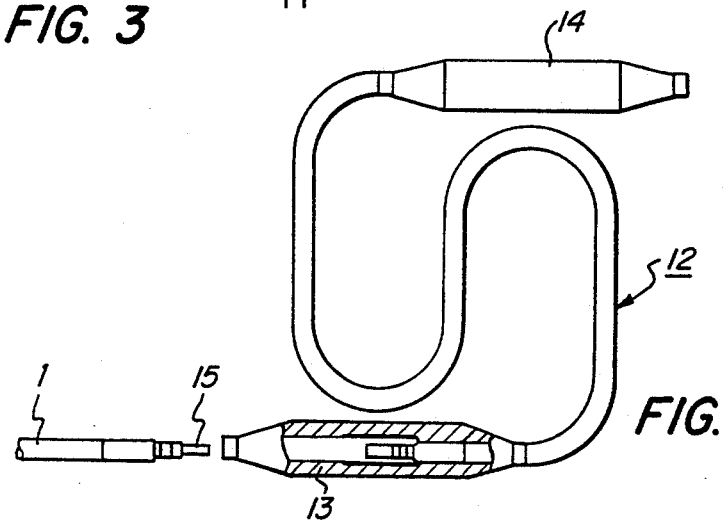
FIG. 4 is a view of a prefabricated section of a cable and an end of a cable of a winding strand prepared for connection to the prefabricated section.
Figure 5:
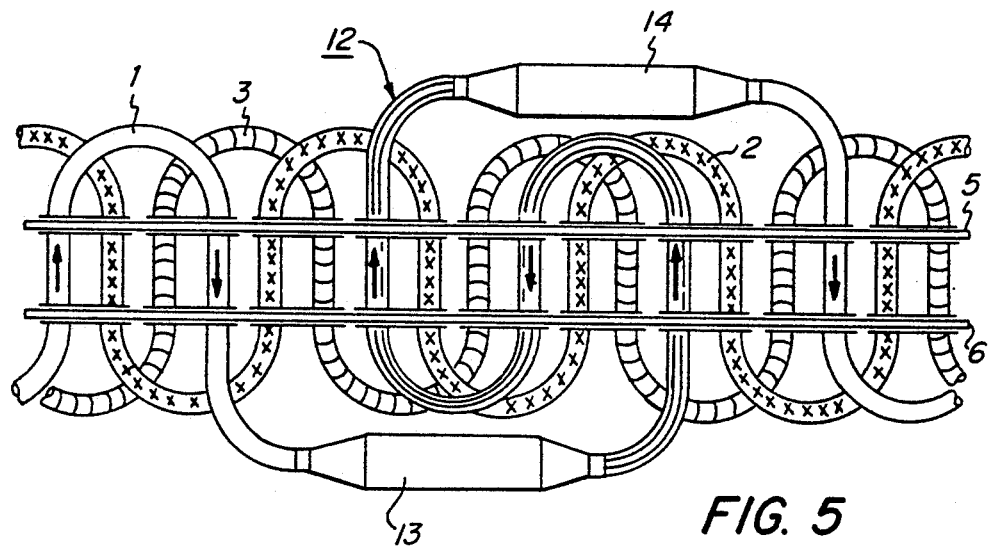
FIGS. 5 and 6 are two views of windings repaired in different ways.

The process of the present invention for repairing a winding is illustrated in FIGS. 3-5. A defect, indicated by arrow P, exists in one of the three cables used for the winding, in this instance, it is cable 1. For example, the defect could be mechanical damage or a short to ground, neither of which can be corrected on the existing cable. Therefore, to eliminate the defect, a section of cable 1 is cut and removed, and is replaced by a prefabricated length of cable 12 as shown in FIG. 4.

In the process, the defective area of cable 1 is first removed from the grooves 7 of inductor 4. This only applies to cable 1 when it is entirely located above both of the other cables 2 and 3. However, under normal conditions, the repair area of all three cables 1, 2 and 3, i.e., the entire winding, must be removed from the grooves, so that the winding sags somewhat in this area when the inductor 4 is attached to the underside of a carrier in the conventional manner. To remove cables 1, 2 and 3 from the grooves 7, the arms 9 of holders 8 need only to be pressed inward. The holders 8 can then be pulled out from the grooves 7 together with the respective cable 1, 2 or 3.

Subsequently, cable 1 is cut approximately at separation areas T1 and T2. The cut section of cable 1 with the defective area is then removed and replaced by cable length 12 (FIG. 4). In the illustrated configuration, cable length 12 is a finished component with one plug-in bushing 13, 14 at each end. The two ends of cable 1 remaining in the winding only need to be cleared of the insulation surrounding conductor 15 in a stepped fashion, so that they become plugs, as shown on the left in FIG. 4. The two ends of cable 1 can then be plugged into the plug-in bushings 13 and 14, so that the electrical continuity of cable 1 is restored.

All the cables that were removed from the grooves 7 are then again pressed into the grooves 7 and the holders 8 are replaced to hold the cables in place. The shape of the winding is then in accordance with FIG. 5. The plug-in bushings 13 and 14 are parallel to inductor 4 in the area of the winding heads. The current flowing through cable 1 remains unchanged with respect to the original winding. This is illustrated by the arrows in FIGS. 3 and 5.

Figure 6:
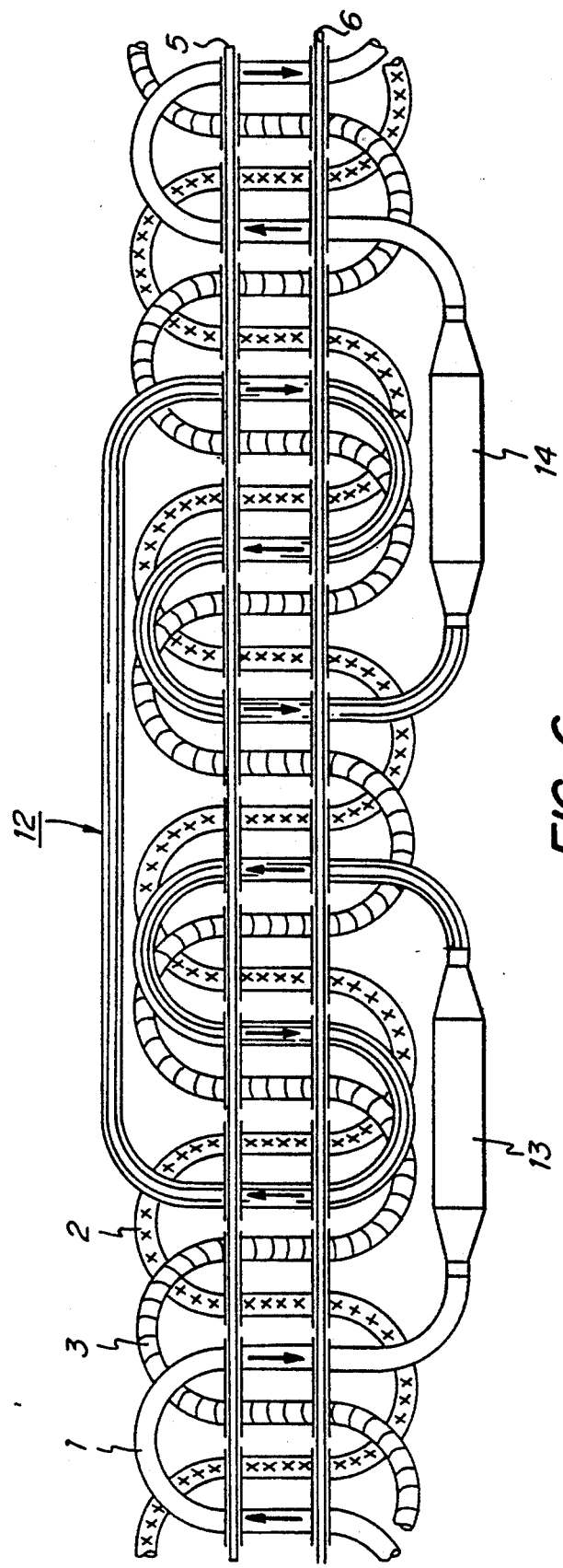

Using the cable length 12 shown in FIG. 4, the plug-in bushings 13 and 14 are on different sides of inductor 4 after the repair. Alternatively, if there is only enough room for plug-in bushings 13 and 14 on one side of inductor 4, a prefabricated cable 12 as shown in FIG. 6 can be used. The length of cable 12 in FIG. 6 is longer than the one in FIG. 4, so that a longer section must also be cut from cable 1.

Conveniently, the prefabricated cables 12 are prebent according to the winding path into which they are to be inserted. This simplifies their insertion into the grooves 7 after the electrical connection has been established.

In principle, the prefabricated cable lengths 12 can also be manufactured without plug-in bushings 13 and 14. In that event, the ends of the cable being used need only to be prepared for an electrical connection. The required bushings are installed at the assembly site. As shown in FIGS. 5 and 6 for plug-in bushings 13 and 14, they are also located in the area of the winding heads.

Thus, it can be seen from the foregoing specification and attached drawings that the method of the present invention provides a unique integration of steps to repair the winding of an electrical linear drive.

The preferred embodiments described above admirably achieve the objects of the invention. However, it will be appreciated that departures can be made by those skilled in the art without departing from the spirit and scope of the invention which is limited only by the following claims.

What is claimed is:

1. A process for repairing a winding of an electrical linear drive having three winding strands formed of electrical cables, one of which has a defect therein, that meander in grooves formed in an inductor belonging to an elongated stator, comprising the steps of:

removing a portion of the one cable containing the defect from the grooves of the inductor;

cutting a section of predetermined length of the one cable containing the defect from the winding strand;

replacing the cut section of the one cable with a prefabricated cable of suitable length and shape; and attaching the one cable and the prefabricated cable to the grooves of the inductor.

2. A process according to claim 1, wherein the prefabricated cable has plug-in bushings at both ends.

3. A process according to claim 2, further including the step of:

removing insulation surrounding end portions of the one cable, which remain in the winding strand after the cutting step, from a conductor of the one cable in steps to form plugs which are then inserted into the plug-in bushings.

4. A process according to claim 2, wherein, during the attaching step, the plug-in bushings are arranged in parallel to the inductor on an outside portion thereof.

5. A process according to claim 1, wherein the prefabricated cable is bent to conform with the cut section of the one cable.

* * * * *